United States Patent [19]

Yamada et al.

[11] Patent Number: 4,956,943
[45] Date of Patent: Sep. 18, 1990

[54] AUTOMOBILE SIDE DOOR ASSEMBLY

[75] Inventors: Kiyoshige Yamada; Takashi Mizuma; Kohji Kishino, all of Hiroshima, Japan

[73] Assignee: Mazda Motor Corporation, Hiroshima, Japan

[21] Appl. No.: 481,558

[22] Filed: Feb. 20, 1990

[30] Foreign Application Priority Data

Feb. 20, 1989 [JP] Japan ................................. 1-39695

[51] Int. Cl.⁵ .............................................. E06B 3/00
[52] U.S. Cl. ...................................... 49/503; 49/479;
49/502; 296/146; 296/152; D12/196
[58] Field of Search ................... 49/503, 502, 479;
296/146, 152; D12/196

[56] References Cited

U.S. PATENT DOCUMENTS 4,688,847  8/1987  Freudenberg ..................... 296/146
4,831,710  5/1989  Katoh et al. .................... 296/146 X

FOREIGN PATENT DOCUMENTS 63-66318  5/1988  Japan .

Primary Examiner—Philip C. Kannan
Attorney, Agent, or Firm—Wenderoth, Lind & Ponack

[57] ABSTRACT

A side door assembly in an automobile body structure for selectively opening and closing an access opening includes a generally rectangular double-walled door panel structure having a windowpane chamber and a windowpane slot both defined therein. A windowpane is supported for movement between elevated and lowered positions through the windowpane slot such that the windowpane in the lowered position can be substantially concealed within the windowpane chamber. The side door assembly also comprises a window sash mounted on the door panel structure so as to extend above the windowpane slot. This window sash has a front sash portion, a generally horizontally extending sash portion continued from the front sash portion and a generally upright rear sash portion continued from the horizontally extending sash portion. There is also provided a bezel mounted on the door panel structure at a location rearwardly of the upright sash portion and at a level above the waist level of an individual. A door handle is operatively supported by the bezel for pivotal movement between released and locked positions, and a weather strip is fitted to the horizontally extending sash portion and a rear edge of the bezel so as to continue from the horizontally extending sash portion down to a rear edge of the door panel structure by way of the rear edge of the bezel.

7 Claims, 2 Drawing Sheets

AUTOMOBILE SIDE DOOR ASSEMBLY

BACKGROUND OF THE INVENTION

1. Field of the Invention

The present invention generally relates to automobile side door assemblies and, more particularly, to a sealing in each of the automobile side door assemblies.

2. Description of the Prior Art

The terms "front" and "rear" used hereinafter in connection with the description of both of the prior art and a preferred embodiment of the present invention are to be understood as used in relation to the direction of forward movement of an automotive vehicle.

An automobile side door assembly in general comprises a generally double-walled door panel structure including inner and outer door panels connected together at bottom and opposite side edges thereof to provide a windowpane chamber and having a windowpane slot defined generally between the top edges of the respective panels for the passage of a windowpane into and out of the windowpane chamber. In order to enhance the accessibility to a door handle in each side door assembly and also to provide an appealing design in each side door assembly, it is well known that some models of automobile have a door handle installed in each side door assembly at a position above the waist level of an individual or above the windowpane slot and rearwardly of the respective side door assembly. An example of this type of door assembly is disclosed in, for example, Japanese Laid-open Utility Model Publication No. 63-66318, published May 2, 1988.

According to the above mentioned publication, the door assembly is of a type applicable to a hardtop model and has a handle base used for each side door assembly and secured to a rear top portion of the door panel structure so as to protrude upwards from the windowpane slot in the door panel structure for the support of the associated door handle. The door handle for each side door assembly disclosed therein is supported for pivotal movement between released and locked positions about an axis lying generally vertically and perpendicular to the longitudinal sense of the automobile body structure.

A sealing system used in each side door assembly, disclosed in the above mentioned publication, to avoid any possible ingress of water from the outside, comprises a weather strip secured to that portion of the automobile body structure which confronts the respective access opening adapted to be selectively closed and opened by the associated side door assembly. Specifically, the weather strip has portions disposed between the windowpane and that portion of the peripheral lip region defining the access opening which is adapted to receive a peripheral edge of the windowpane when the latter is elevated to a closed position, and between the handle base and a rear pillar.

Another type of automobile side door assembly is also well known which, in addition to the above mentioned door panel structure, further comprises a generally U-shaped window sash having opposite arms fixed to the door panel structure and positioned immediately above the windowpane slot so that, when the windowpane is elevated to the closed position out of the windowpane chamber, side and top edges of the windowpane can be received in the window sash. When the handle structure disclosed in the above mentioned publication is applied to this type of automobile side door assembly having the window sash, a portion of the window sash will be located between the pillar in the automobile body structure and the windowpane, requiring the employment of a sealing strip between the window sash and the pillar. This arrangement tends to increase the thickness of the side door assembly as a whole and this increase in thickness of the side door assembly tends to result in narrowing the interior space in the automobile body structure.

SUMMARY OF THE INVENTION

Accordingly, the present invention has been devised with a view to providing an improved automobile side door assembly of a type having a door handle positioned above the waist line, which exhibits an increased sealing capability with no substantial increase in thickness thereof.

According to the present invention, there is provided at least one side door assembly in an automobile body structure for selectively opening and closing an access opening leading into the interior of the automobile body structure. The side door assembly comprises a generally rectangular double-walled door panel structure including out and inner panels connected together to define a windowpane chamber therebetween while leaving a windowpane slot at an upper edge of the door panel structure. A windowpane is supported for movement between elevated and lowered positions such that said windowpane in said lowered position can be substantially concealed within the windowpane chamber. The side door assembly also comprises a window sash mounted on the door panel structure and extending above the windowpane slot so as to define a window that is adapted to be closed by the windowpane when and so long as the latter is in the elevated position. This window sash has a front sash portion, a generally horizontally extending sash portion continued from the front sash portion and a generally upright rear sash portion continued from said horizontally extending sash portion. There is also provided a bezel mounted on the door panel structure at a location rearwardly of the upright sash portion and at a level above the waist level of an individual.

A door handle is operatively supported by the bezel for pivotal movement between a released position, at which the side door assembly is in position to open the access opening, and a locked position at which the side door assembly is in position to close the access opening. A weather strip is fitted to the horizontally extending sash portion and a rear edge of the bezel so as to continue from the horizontally extending sash portion down to a rear edge of the door panel structure by way of the rear edge of the bezel.

Preferably, the side door assembly may further comprise a handle support bracket similar in shape to the shape of the bezel and having a straight upright edge and a bottom edge, said handle support bracket being welded at the straight upright edge to the upright rear sash portion and at the bottom edge to the inner panel of the door panel structure, wherein said bezel is rigidly secured to said handle support bracket.

BRIEF DESCRIPTION OF THE DRAWINGS

This and other objects and features of the present invention will become clear from the following description of the present invention taken in connection with a preferred embodiment thereof with reference to the accompanying drawings, in which.

DETAILED DESCRIPTION OF THE EMBODIMENT

Figure 2:
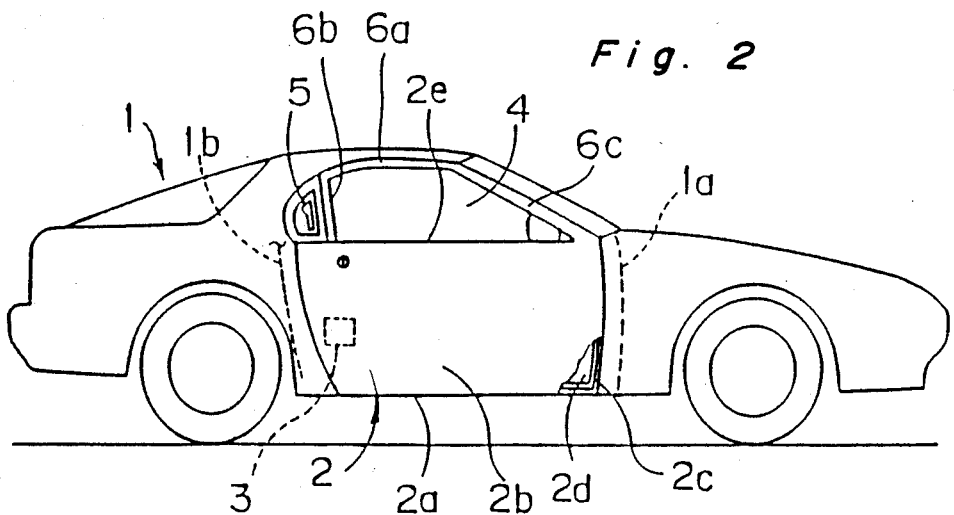
FIG. 2 is a schematic side view, with a portion cut away, of an automotive vehicle having left-hand and right-hand side door assemblies each embodying the present invention.

Referring first FIG. 2, there is shown an automobile body structure 1 designed for a low-height coupe model having a relatively small ground clearance. As shown therein, the automobile body structure 1 has left-hand and right-hand side door assemblies generally identified by 2 and positioned at a relatively low level above the ground because of the low overall height of a body structure. The side door assemblies 2 each having a door handle 5 mounted thereon in a manner as will be detailed later are of generally identical construction and, therefore, in describing the emdodiment of the present invention, reference will be made only to the left-hand side door assembly for the sake of brevity.

The side door assembly 2 used in the illustrated body structure 1 comprises a door panel structure 2a of generally double-walled construction including outer and inner door panels 2b and 2c connected together at bottom and opposite side edges thereof to provide a windowpane chamber 2d defined therebetween and having a windowpane slot 2e defined generally between top edges of the respective outer and inner panels 2b and 2c for the passage of a windowpane 4 into and out of the windowpane chamber 2d. The door panel structure 2a is hinged at a front edge thereof to a front pillar 1a of the automobile body structure 1 for pivotal movement between a closed position, at which an access opening leading into the interior of the automobile body structure 1 is blocked, and an opened position at which the access opening is opened. The side door assembly 2 includes a door lock mechanism 3 of any known construction. This door lock mechanism 3 may comprise a latch (not shown) housed within the windowpane chamber 2d at a location inwardly adjacent a rear edge thereof remote from the front pillar 1a and clear from that area of the windowpane chamber 2d which may be occupied by the windowpane 4 when and so long as the latter is in an opened position at which the windowpane 4 is substantially concealed within the windowpane chamber 2d, and a striker (not shown) rigidly installed at a rear pillar 1b of the automobile body structure 1 for engagement with the latch when the door assembly 2 is in the closed position.

Although not shown, the side door assembly 2 also includes a windowpane regulator installed within the windowpane chamber 2d and operatively coupled with the windowpane 4 for driving the latter selectively up and down, namely, between an elevated position, at which the window can be closed, and a lowered position at which the windowpane 4 can be substantially concealed within the windowpane chamber 2d while opening the window, as is well known to those skilled in the art. This windowpane regulator may be either a hand-operated type or a power-operated type.

Figure 1:
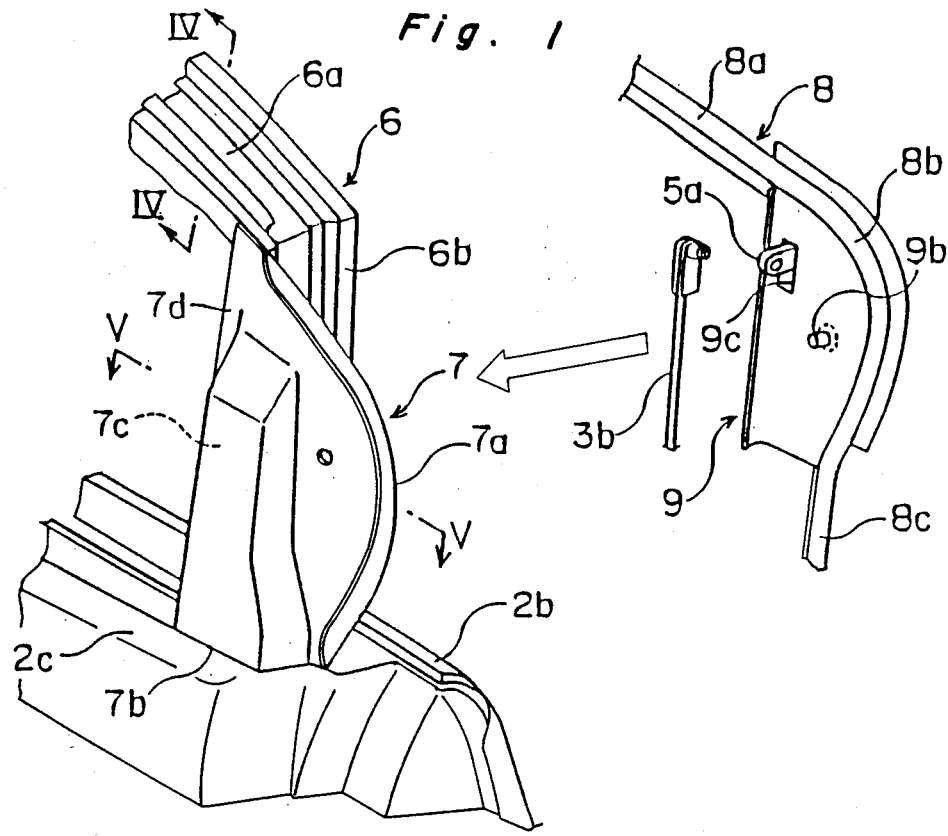
FIG. 1 is an exploded view of a rear top portion of a left-hand side door assembly as viewed from the interior of the automobile body structure.
Figure 3:
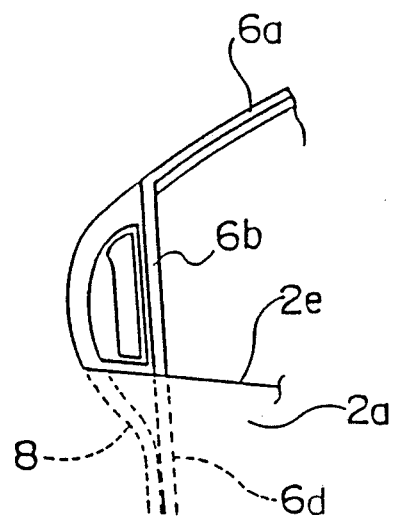
FIG. 3 is a side view of the rear top portion of the left-hand side door assembly as viewed from the outside of the automobile body structure.
Figure 4:
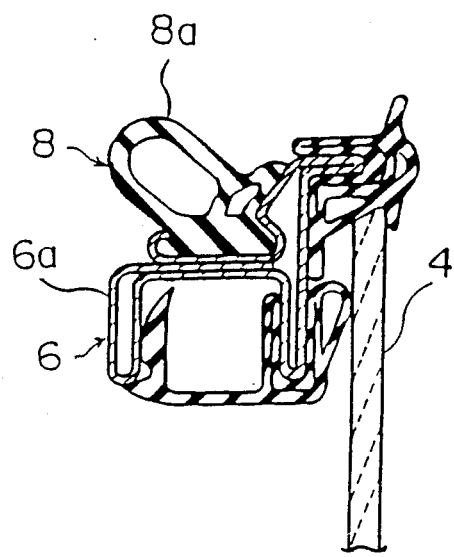
FIG. 4 is a cross-sectional view taken along the line IV—IV in FIG. 1.
Figure 5:
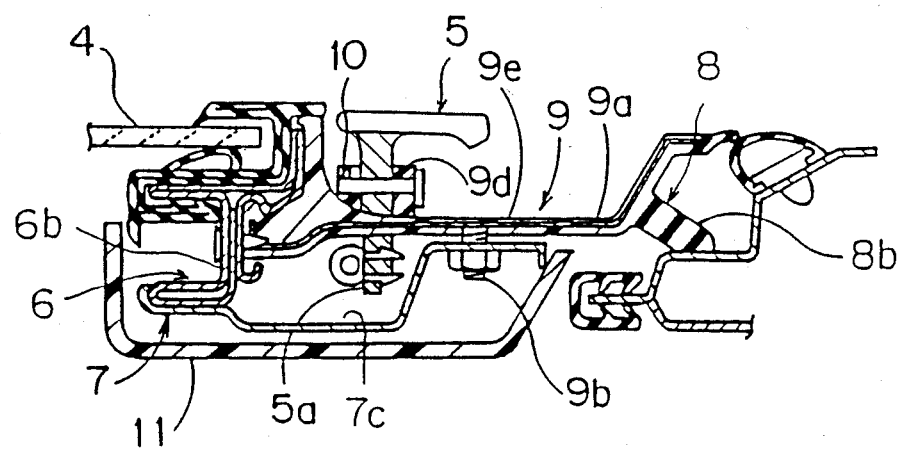
FIG. 5 is a cross-sectional view taken along the line V—V in FIG. 1.

As shown in FIGS. 1 to 3, the illustrated side door assembly 2 has a window sash 6 of generally inverted U-shape positioned above the door panel structure 2a. This window sash 6 is of one-piece construction formed by bending a metal strip by means of any known press work and includes a generally horizontally extending sash portion 6a of a cross-sectional shape as best shown in FIG. 4, a rear upright sash portion 6b of a cross-sectional shape as best shown in FIG. 5 and continued downwardly from a rear end of the horizontally extending sash portion 6a and a front inclined sash portion 6c continued from and inclined frontwardly downwardly from a front end of the horizontally extending sash portion 6a. The window sash 6 of the above described construction is rigidly mounted on the door panel structure 2a with respective lower ends of the rear upright and front inclined sash portions 6b and 6c welded, or otherwise rigidly secured, to a frame structure used inside the door panel structure.

It is to be noted that the rear upright sash portion 6b connected at its lower end to the door panel structure 2a is continued to a generally U-sectioned guide rail 6d housed within the door panel structure 2a so that, during the movement of the windowpane 4 between the elevated and lowered positions, a rear side edge of the windowpane 4 can be guided smoothly along the rear upright sash portion 6b and the guide rail 6d. If desired, the guide rail 6d may be an integral part of the rear upright sash 6b, that is, the use of the separate guide rail can be dispensed with if the rear upright sash portion 6b has a length sufficient to extend downwards into the windowpane chamber 2.

As best shown in FIGS. 1 and 3, a generally D-shaped handle support bracket 7 having a rear curved edge 7a, a bottom straight edge 7b and a front upright edge 7d is welded at the front upright edge 7d to that inner surface region of the rear upright sash portion 6b, which confronts the interior of the automobile body structure 1, and also at the bottom straight edge 7b to the inner panel 2c of the door panel structure 2a. The front upright edge 7d of the handle support bracket 7 has a length sufficient to permit the horizontally extending sash portion 6a to be streamlined with the rear curved edge 7a of the handle support bracket 7 with no substantial indent formed at the transit point between the horizontally extending sash portion 6a and the rear curved edge 7a of the handle support bracket 7. As best shown in FIGS. 1 and 5, the handle support bracket 7 has a generally rectangular recess defined at 7c for accommodating a link system used between the door handle 5 and the door lock mechanism 3 (FIG. 2).

The side door assembly 2 of the above described construction includes, in accordance with the present invention, a weather strip 8 made of synthetic or natural rubber and disposed in part on a portion of the horizontally extending sash portion 6a and in part on the rear curved edge 7a of the handle support bracket 7 as will now be described. As best shown in FIGS. 1, 4 and 5, the weather strip 8 is of one-piece construction including a main sealing segment 8a having one end inserted into the horizontally extending sash portion 6a of the window sash 6, a curved sealing segment 8b continued from the opposite end of the main sealing segment 8a and fitted to the handle support bracket 7 so as to extend along the rear curved edge 7a thereof, and an undersealing segment 8c positioned on one side of the curved sealing segment 8b opposite to the main sealing segment 8a. The under-sealing segment 8c is continued downwardly from the curved sealing segment 8b and secured to a rear edge of the inner panel 2c of the door panel structure 2a so that, when the side door assembly 2 is in the closed position, the under-sealing segment 8c can be sealingly sandwiched between the rear edge of the door panel structure 2a and the rear pillar 1b of the automobile body structure 1. Thus, it will readily be understood that the weather strip 8 designed in accordance with the present invention continuously extends from the window sash 6 down to the rear edge of the inner panel 2c of the door panel structure 2a through the rear curved edge 7a of the handle support bracket 7 such that, when and so long as the side door assembly 2 is pivoted to the closed position, a satisfactory sealing can be accomplished between the window sash 6, the rear curved edge 7a and the rear edge of the door panel structure 2a.

The weather strip 8 has a bezel 9 of hard plastics formed integrally with the curved sealing segment 8b thereof. The integration of the weather strip 8 with the bezel 9 can be accomplished by the use of any known in-mold plastics molding technique. The bezel 9 so integrated with the curved sealing segment 8b as described above has a shape generally similar to the shape of the handle support bracket 7. As best shown in FIG. 5, the bezel 9 includes an interlaminar metal sheet 9a embedded therein and also a welded bolt 9b welded at one end to the interlaminar metal sheet 9b so as to extend perpendicular to the bezel 9 and interiorly of the automobile body structure 1. As best shown in FIG. 1, the bezel 9 has a generally rectangular slot 9c defined therein so as to extend vertically for accommodating therethrough a handle lever 5a which is connected with, or otherwise integrally formed with, the door handle 5.

The bezel 9 is firmly connected to the handle support bracket 7 by means of a nut which is fastened to the welded bolt 9b after the welded bolt 9b has been passed through a hole defined in the handle support bracket 7 as best shown in FIG. 5.

For the support of the door handle 5, the bezel 9 has a recess defined at 9e and is formed with a handle bracket 9d so as to extend laterally outwardly from a portion of the bottom of the recess 9e in the bezel 9. This handle bracket 9d has a generally rectangular-sectioned through-hole defined therein, which through-hole is aligned with the rectangular slot 9c in the bezel 9 such that the door handle 5 having the handle lever 5a can be supported by the handle bracket 9d with the handle lever 5a loosely extending inwardly through the rectangular-sectioned through-hole and then through the slot 9c and is pivotable between released and locked positions about a pivot shaft 10 passing through opposite wall portions of the handle bracket 9d via a generally intermediate portion of the handle lever 5a so as to extend in a direction generally parallel to the longitudinal sense of the automobile body structure 1. Thus, it will be readily understood that, with the door handle 5 so supported in the manner as hereinabove described, the door handle 5 can be pivoted about the pivot shaft 10 between the released and locked positions in a plane generally parallel to the ground surface.

A free end of the handle lever 5a opposite to the door handle 5 is situated in a space delimited between the bezel 9 and the handle support bracket 7 and within the recess 7c defined in the handle support bracket 7 and is operatively coupled with the door lock mechanism 3 through a release rod 3b as shown in FIG. 1. Accordingly, it will readily be understood that, when the door handle 5 normally biased to the locked position in a well-known manner is pulled to the released position, the latch (not shown) forming a part of the door lock mechanism 3 can be disengaged from the striker fast with the rear pillar 1b of the automobile body structure 1.

For decorative purposes an interior garnish 11 made of synthetic resin is fitted so as to cover the handle support bracket 7 thereby to conceal the handle support bracket 7 and the associated parts from the sight of a passenger or driver occupying a seat inside the automobile body structure 1.

From the foregoing description of the present invention, it has now become clear that, when the side door assembly 2 is in the closed position closing the access opening leading into the interior of the automobile body structure 1, the weather strip 8 operates to seal a gap extending continuously from a position corresponding to the horizontally extending sash portion 6a of the window sash 6 to a position corresponding to the rear side edge of the inner panel 2c of the side door assembly 2, thereby to effectively avoid any possible ingress of water from the outside. Also, since the window sash 6 is positioned frontwardly of the door handle 5, the sealing arrangement at the rear curved edge of the handle support bracket 7 can be made compact and having a reduced wall thickness and, therefore, it will not constitute an obstruction which would otherwise narrow the interior space in the automobile body structure. Moreover, since the weather strip 8 is of one-piece construction including the main sealing segment 8a, the curved sealing segment 8b and the undersealing segment 8c, the weather strip 8 will not be separated easily from the side door assembly 2.

The provision of the rear upright sash portion 6b extending angularly from the horizontally extending sash portion 6a makes it possible to reinforce the window sash 6 as a whole. In addition, since the rear upright sash portion 6b concurrently serves as a windowpane guide cooperable with the guide rail 6d, the use of any separate guide member structure can be advantageously dispensed with.

Thus, according to the present invention, the bezel for the support of the door handle is provided at a rear lateral portion of the window sash positioned above the waist line of an individual, that is, above the windowpane slot in the door panel structure, and the weather strip is fitted continuously over the window sash and also over the rear curved edge of the bezel to provide a continuous seal capable of exhibiting improved sealing. Moreover, since there is no window sash in the vicinity of the curved sealing segment of the weather strip over the rear curved edge of the bezel, the side door assembly can be manufactured having a reduced thickness and, hence, the interior of the automobile body structure can be made relatively large.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A side door assembly in an automobile body structure for selectively opening and closing an access opening leading into the interior of the automobile body structure, which assembly comprises:

a generally rectangular double-walled door panel structure including outer and inner panels connected together to define a windowpane chamber therebetween while leaving a windowpane slot at an upper edge of the door panel structure;

a windowpane supported for movement between elevated and lowered positions, said windowpane in said lowered position being substantially concealed within the windowpane chamber;

a window sash mounted on the door panel structure and extending above the windowpane slot so as to define a window, said windowpane in said elevated position closing the window, said window sash having a generally upwardly extending front sash portion, a generally rearwardly extending sash portion continued from an upper end of the front sash portion and a generally downwardly extending rear sash portion continued from a rear end of said rearwardly extending sash portion;

a bezel mounted on the door panel structure at a location rearwardly of the downwardly extending sash portion;

a door handle supported by the bezel for movement between a released position at which the side door assembly is in position to open the access opening, and a locked position at which the side door assembly is in position to close the access opening; and a weather strip fitted to the rearwardly extending sash portion and a rear edge of the bezel so as to continue from the rearwardly extending sash portion down to a rear edge of the door panel structure by way of the rear edge of the bezel.

2. The side door assembly as claimed in claim 1, wherein said downwardly extending sash portion extends generally upright.

3. The side door assembly as claimed in claim 2, wherein said handle is pivotable in a direction generally parallel to said downwardly extending sash portion.

4. The side door assembly as claimed in claim 2, further comprising a handle support bracket similar in shape to the shape of the bezel and having a straight upright edge and a bottom edge, said handle support bracket being welded at said straight upright edge thereof to the upright rear sash portion and at said bottom edge thereof to the inner panel of the door panel structure and wherein said bezel is rigidly secured to said handle support bracket.

5. The side door assembly as claimed in claim 4, further comprising an interior garnish for covering said handle support bracket.

6. The side door assembly as claimed in claim 1, wherein said bezel is located above the upper edge of said door panel structure.

7. The side door assembly as claimed in claim 1, wherein said bezel comprises a core member and a plastic member covering said core member.

* * * * *